(12) United States Patent
McCutchen

(10) Patent No.: US 10,384,970 B2
(45) Date of Patent: Aug. 20, 2019

(54) BICONICAL MULTIPHASE ROTARY FILTER

(71) Applicant: VORSANA INC., Brush Prairie, WA (US)

(72) Inventor: David J. McCutchen, Portland, OR (US)

(73) Assignee: Vorsana Inc., Brush Prairie, WA (US)

( * ) Notice: Subject to any disclaimer, the term of this patent is extended or adjusted under 35 U.S.C. 154(b) by 194 days.

(21) Appl. No.: 15/613,734

(22) Filed: Jun. 5, 2017

(65) Prior Publication Data
US 2017/0349469 A1 Dec. 7, 2017

Related U.S. Application Data

(60) Provisional application No. 62/392,657, filed on Jun. 6, 2016.

(51) Int. Cl.
*B01D 19/00* (2006.01)
*C02F 11/127* (2019.01)
(Continued)

(52) U.S. Cl.
CPC ........ *C02F 11/127* (2013.01); *B01D 17/0214* (2013.01); *B01D 17/0217* (2013.01); *B01D 19/0026* (2013.01); *B01D 19/0031* (2013.01); *B01D 19/0036* (2013.01); *B01D 19/0052* (2013.01); *B01D 19/0057* (2013.01); *B01D 61/147* (2013.01); *B01D 63/16* (2013.01); *B01D 65/02* (2013.01); *C02F 1/20* (2013.01);
(Continued)

(58) Field of Classification Search
CPC .............................. B01D 19/00; B01D 19/0026

USPC ............................................ 95/241, 260, 261
See application file for complete search history.

(56) References Cited

U.S. PATENT DOCUMENTS 3,843,520 A 10/1974 Bottorf
3,955,754 A 5/1976 Schaper
(Continued)

FOREIGN PATENT DOCUMENTS

CN 203816801 U * 9/2014 ............... B04C 5/00
WO 2009082615 7/2009

OTHER PUBLICATIONS

International Search Report and Written Opinion, PCT/US17/35918, McCutchen, D., dated Aug. 28, 2017.

*Primary Examiner* — Robert A Hopkins
(74) *Attorney, Agent, or Firm* — Miller Nash Graham & Dunn LLP

(57) ABSTRACT

An apparatus for filtration has a feed of sludge, containing liquid, solids and gases fed into a tank, the tank containing at least one spinning separation filter comprising a filter cone set having a filter screen, and a barrier cone, arranged roughly in parallel, and defining a conical workspace between them, the conical workspace having a peripheral opening to the tank and a central opening communicating with the interiors of one or more hollow shafts supporting the barrier cone and the filter cone, the upper shaft supporting the barrier cone having an upper axial channel for the exit of gases, the lower shaft supporting the center of the filter cone having a lower axial channel for the exit of liquid or oil, motor means for producing rotation in said at least one spinning separation filter, and a filtrate liquid reservoir located underneath the filter cone for capturing the filtrate passing through the filter screen.

14 Claims, 5 Drawing Sheets

(51) Int. Cl.
  *B01D 61/14* (2006.01)
  *B01D 63/16* (2006.01)
  *C02F 1/20* (2006.01)
  *C02F 1/38* (2006.01)
  *B01D 65/02* (2006.01)
  *C02F 1/44* (2006.01)
  *B01D 17/02* (2006.01)
  *C02F 103/08* (2006.01)
  *C02F 103/10* (2006.01)
  *C02F 103/20* (2006.01)
  *C02F 103/32* (2006.01)

(52) U.S. Cl.
  CPC .............. *C02F 1/385* (2013.01); *C02F 1/444* (2013.01); *B01D 2315/02* (2013.01); *B01D 2321/04* (2013.01); *C02F 2103/08* (2013.01); *C02F 2103/10* (2013.01); *C02F 2103/20* (2013.01); *C02F 2103/32* (2013.01); *C02F 2301/026* (2013.01)

(56) References Cited

U.S. PATENT DOCUMENTS

| | | |
|---|---|---|
| 4,961,722 A | 10/1990 | Taylor et al. |
| 5,882,529 A | 3/1999 | Gupta |
| 7,757,866 B2 | 7/2010 | McCutchen |
| 9,011,646 B2 | 4/2015 | McCutchen et al. |

\* cited by examiner

BICONICAL MULTIPHASE ROTARY FILTER

RELATED APPLICATION

This application claims the benefit of U.S. Provisional Patent Application No. 62/392,657, filed Jun. 6, 2016.

BACKGROUND

Sludge dewatering filters have generally included screw and roller presses as well as filter screens, which typically require backwash cycles to prevent the filter from becoming clogged. Annular crossflow filters such as the McCutchen TriPhase Filter U.S. Pat. No. 7,757,866 (Jul. 20, 2010) feature an annular crossflow filter in at least one spinning disk, whose motion generates a shear lift effect which helps to keep the solids from clogging the filter. The faster the disk can spin, the greater will be the crossflow motion relative to the feed and the greater the shear lift effect. However, the centrifugal force from a rapidly spinning disk will make the feed move more rapidly outward across the filter surface, and reduce the time for the filtration to take place. While this approach can separate liquids, solids and gas phases, it cannot also at the same time separate a liquid oil phase. What is needed is a way to make best use of a shear lift effect for filtration from a spinning filter surface, with an increased residence time, and a simultaneous separation of solid, liquid, gas and oil phases.

SUMMARY

A feed of sludge, containing liquid, solids and gases enters a tank containing at least one spinning separation filter comprising a filter cone set with a filter screen and a barrier cone, arranged roughly in parallel, and defining a conical workspace between them. This workspace has a peripheral opening to the tank and a central opening. The central opening communicates with the interiors of one or more hollow shafts supporting the upper barrier cone and the lower filter cone. The upper shaft supporting the barrier cone has an upper axial channel for the exit of gases, and the lower shaft supporting the center of the filter cone has a lower axial channel for the exit of liquid or oil.

A filtrate liquid reservoir is located underneath the filter cone for capturing the filtrate passing through the filter screen. For a single filter cone in the tank, the outer edge of the rotating filter cone is supported by a leak-proof connection to a static cylindrical wall which circumscribes the filtrate liquid reservoir. For multiple stacked filter cone sets in the tank, the filtrate liquid reservoir is incorporated into each spinning filter cone set, with the filtrate exiting through a return pipe to the central axial shaft drain, and the underside of the filter cone set acts as the barrier cone defining the workspace for the next filter cone set farther down in the sequence.

In the tank, the feed enters the tank into the feed zone, which includes the portion of the tank above the opening to the workspace. The portion opposite the workspace opening is the I/O zone, and the portion below the I/O zone is the solids zone, where the solids rejected from the filter surface are ejected by the motion of the filter cone.

Vanes on the backside of the rotating barrier cone can serve to advect the feed to improve its flow into the workspace. As the feed enters the workspace, it is advected by the spinning barrier and filter disks. As the filtrate liquid falls through the filter disk into the filtrate liquid reservoir to be extracted, the rejected solids are spun outward to re-enter the tank into the solids zone, where the concentrated solids exit through a solids drain. Meanwhile, as gases are drawn inward from the workspace by low pressure and exit through the upper axial channel, liquid oil riding on the top of the feed will overflow into the lower axial channel for extraction. Thus, multiple phases of liquids, solids, gases and oil can be continuously separated.

For a stacked set of filter cone sets, the filtrate exits into a central axial drain. If the tank is divided vertically into one or more stages, then the filtrate from a first stage can re-enter the next stage of the tank from the center outward, then enter from the outside in through the one or more workspaces of the next stage. The filter screens, angles or rotation characteristics of each stage can be varied, to make a sequential processing sequence, such as to screen to successively finer levels of separation.

For backwashing a single filter cone, a relatively static backwash hose in close proximity to the filter screen can force liquid back through the rotating filter, with, for example, a linear radial motion of the hose from one end to the other being sufficient to cover the area of the rotating filter screen.

For backwashing a stacked filter set, reversal of the direction of rotation of the filter sets will serve to pump liquid or filtrate back from the central axial drain, through the return pipes and the liquid filtrate reservoir, and back through the filter screen to clean it and reject the solids outward.

DETAILED DESCRIPTION

Listed Parts

Figure 1:
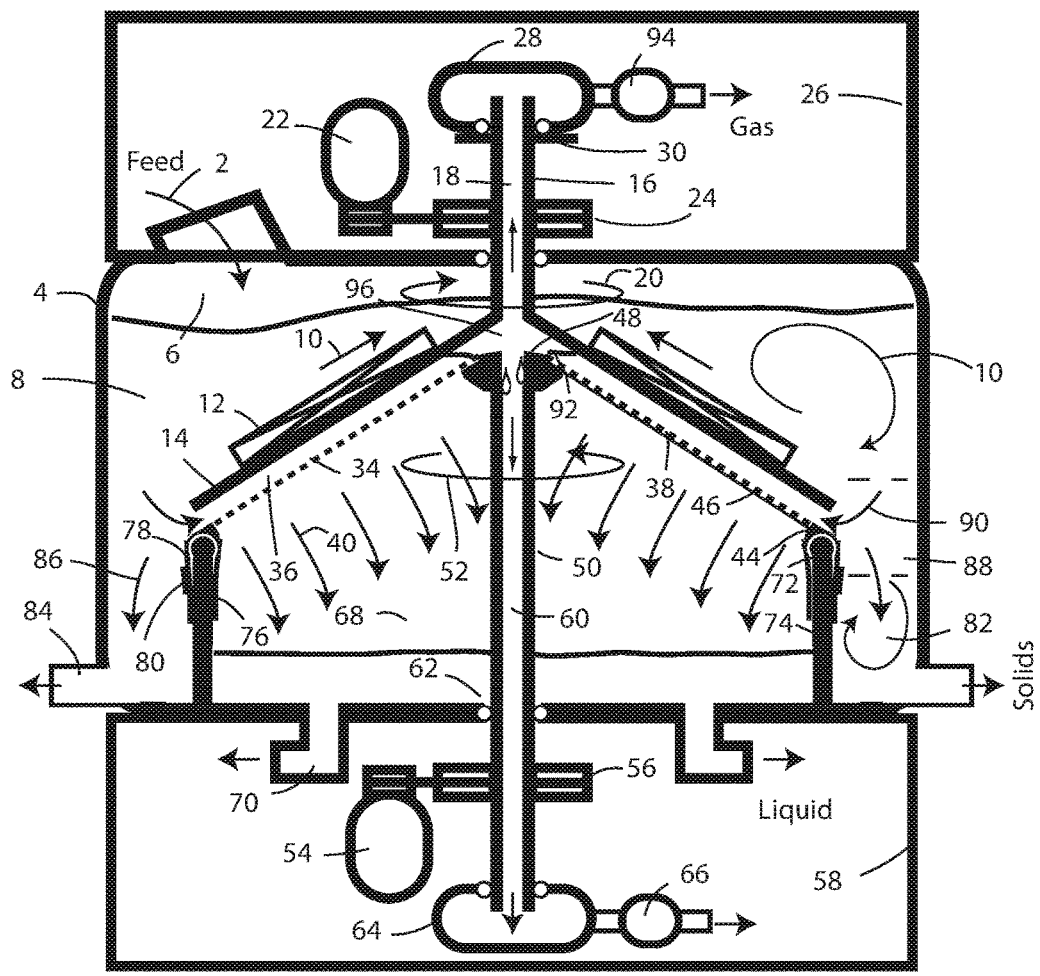
FIG. 1 shows a cross section of an embodiment of a biconical multiphase rotary filter.

2. Feed
4. Tank
6. Feed inlet
8. Feed zone
10. Flow pattern
12. Vanes
14. Rotating barrier cone
16. Axial upper shaft
18. Upper axial chamber
20. Direction of rotation for barrier cone
22. Upper rotation motor
24. Mechanical coupling means for upper motor
26. Upper elements
28. Holding tank with gas exit
30. Rotary seal for upper elements
32. Gas holding tank
34. Filter cone
36. Workspace between cones
38. Filter screen
40. Filtrate 42. Filtrate liquids reservoir
44. Outer cone ring
46. Support ribs
48. Center block
50. Lower axial shaft
52. Filter cone direction of rotation
54. Filter cone motor
56. Mechanical coupling means for filter cone
58. Lower elements
60. Lower axial channel
62. Rotary seal for lower elements
64. Oil holding tank
66. Pump
68. Liquids reservoir
70. Drain
72. Top of filtrate liquids reservoir wall
74. Reservoir wall
76. Inner seal strip
78. Outer seal strip
80. Danes on outer surface of outer seal strip
82. Solids zone
84. Solids outlet
86. Rejected solids stream
88. I/O zone
90. Inward stream into workspace
92. Optimal line for filling workspace
94. Gas outlet pump
96. Central space
98. Filter screen outer edge
100. Overlap seam
102. Central outlet hole
104. Cross section of cone shape
106. Scalloped pattern
108. Direction of rotation
110. Flow pattern
112. Filter cone surface
114. Feed zone flow pattern
116. Axis of rotation
118. Filtrate reservoir in stacked set
120. Return pipe
122. Return flow to central drain
124. Underside of filter cone for stacked set
126. Vent holes
128. Axial drain with closed top
130. Stacked filter set This disclosure can be applied to the filtration of a wide variety of feeds, including seawater, manure, mined material, industrial waste, food processing, polluted sediments, and wastewater. The advantages of this disclosure are the continuous nature of the process, the non-clogging nature of the rotating filter wheel, the separation of several phases at once, and the relative low cost and mechanical simplicity of this approach.

The filter cone set and its associated parts will first be described for a single cone set arrangement, and then for an arrangement with stacked filter cone sets, to increase the effective filter surface within a compact space.

In FIG. 1, illustrating a single filter cone set, a feed 2 enters a tank 4 though a feed inlet 6 into a feed zone 8. Within the tank 4, the feed in the feed zone can be advected in a flow pattern 10 by vanes 12 on the rotating barrier cone 14.

The barrier cone 14 is supported by an axial upper shaft 16. This shaft is hollow, with an upper axial channel 18. The barrier cone is rotated in a direction 20 by mechanical force applied to the upper shaft, such as by a rotation motor 22, coupled to mechanical coupling means 24 for transmission of force to the shaft such as a direct coupling, or indirect means such as drive wheels, fan belts, chains or gears, with appropriate bearings and support frames. These upper rotation elements 26 should be located outside of the tank 4 for durability and to ease maintenance. The upper elements also include means for capturing any extracted gas coming out of the upper axial channel 18, such as a holding tank with a gas exit 28. To prevent leaks, a rotary seal 30 should be used where it exits the tank 4 and where it enters the gas holding tank 32.

Below the barrier cone 14 is the filter cone 34. The two cones 14 and 34 are arranged to be roughly parallel, and define a workspace 36 between them. Roughly parallel includes the cases where the workspace has a changing separation distance between the disks in a radial direction from the axis to the periphery of the workspace, such as where the separation is wider at the periphery, and tapers either in a straight line or in a curved profile toward the axis. The cones can be coaxial, or they can be offset from each other, so that the workspace is wider on one side than the other. This allows for an arrangement where the workspace is wider on one side for a different pattern of inward flow of the feed and outward flow of the solids, such as where the wider workspace allows more inward and outward flow, and the narrower space has higher pressure for more filtrate to flow through the filter cone.

The filter cone is primarily comprised of a filter screen 38 typically shaped into a cone. The cone shown here has a corner angle of thirty degrees. The cone shape is designed to allow for an optimal balance of forces for filtration at the filter surface. The feed 2 is first forced inward into the workspace, due to the fact that the disks are submerged, augmented by the flow pattern 10 caused by the vanes 12 on the barrier cone 14, and optionally from relatively low pressure applied such as in the upper axial channel 18 to help suck in the feed 2. Both the rotation of the filter cone and the shear lift effect combine to keep the solids away from the filter screen 38 surface while allowing the filtrate liquid to pass through the pores as filtrate 40 into the filtrate liquids reservoir 42.

One example support structure for the shape of the filter cone is an outer cone ring 44 connected by support ribs 46 to a center block 48 coupled to the lower axial shaft 50, which is turned in a direction of rotation 52 by mechanical force applied to the lower shaft, such as by a motor 54, coupled to mechanical coupling means 56 for transmission of force to the shaft such as a direct coupling or indirect means such as drive wheels, fan belts, chains or gears, together with appropriate bearings and support frames. These lower elements 58 should be located outside of the tank 4 to ease maintenance. The lower elements 58 also include means for capturing any extracted oil or overflow coming through the lower axial channel 60. To prevent leaks, rotary seals 62 should be used where it exits the tank 4 and where it enters the oil holding tank 64, where a pump 66 can be used to extract the oil for use. Similarly, the filtrate liquid is drained from the liquids reservoir 68 through one or more drains 70 and optional pumps.

It is important to maintain an effective seal between the liquids reservoir 68 and the rest of the interior of the tank 4, so as to prevent contamination of the filtrate. For this reason, one possible method of maintaining this separation is to have a rotary seal formed between the outer edge of the filter cone 44 and the top 72 of the cylindrical wall 74 of the liquids reservoir 68. This can be done for example by flexible cylindrical strips of a suitable material such as vinyl or a flexible plastic which are attached to the filter cone 34 and rotate along with it. The inner seal strip 76 will tend to be forced against the reservoir wall 74 by the centrifugal force of the cone's rotation, thus maintaining the seal, and the outer seal strip 78 can also be forced inward against the wall by the addition of vanes 80 on the outer surface of the strip, which push the strip inward due to the resistance from the vanes' passage through the denser material in the solids zone 82, which lead to the solids outlet 84.

The solids zone 82 receives the rejected solids stream 86 from the filter cone 34 coming from the I/O zone 88, while the simultaneous inward feed stream into the workspace in the I/O zone is shown at 90.

In operation, the optimal approximate line for filling the workspace is shown at 92. This allows the maximal use of the filter surface area of the filter cone for removing the liquid, while allowing occasional overflow of any oil floating atop the feed to spill into the lower axial channel 60 for collection. To maintain this optimal line, the gas outlet pump 94 can be used to raise or lower the pressure in the upper axial channel 18 and the central space 96 to draw in or push back the feed level as needed.

If backwash cleaning of the cone filter is needed, then the filtrate liquid reservoir 68 can be filled with the cleaning fluid while the workspace and the outer tank are drained down to the line of the solids zone, and the cleaning fluid forced back through the filter. As an alternative to increase the local pressure against the back side of the filter screen, the backwash fluid can be pumped through a static radial hose with an outlet slot adjacent to the backside of the rotating filter surface, to force the sediments back through the rotating screen into the workspace to be rejected into the solids zone.

The filter cone can have different types of filter screens as needed for the task. For example, perforated stainless steel sheets can form the cone, with round holes in a dense pattern. The round holes have advantages for setting up swirling vortex patterns around each hole due to crossflow which help to exclude the solids, as has been shown by van Dinther et al. "High-flux membrane separation using fluid skimming dominated convective fluid flow". Other types of filter screens or sheets can be used, made of metal plastic, ceramic or other suitable screens, and can be incorporated into the filter cone either in sections or as a large continuous surface. Microfiltration filter screen can be used, and to help force the filtrate through fine pores, the feed chamber 8 and workspace 36 can be pressurized relative to the filtrate liquid reservoir 68.

Figure 2:
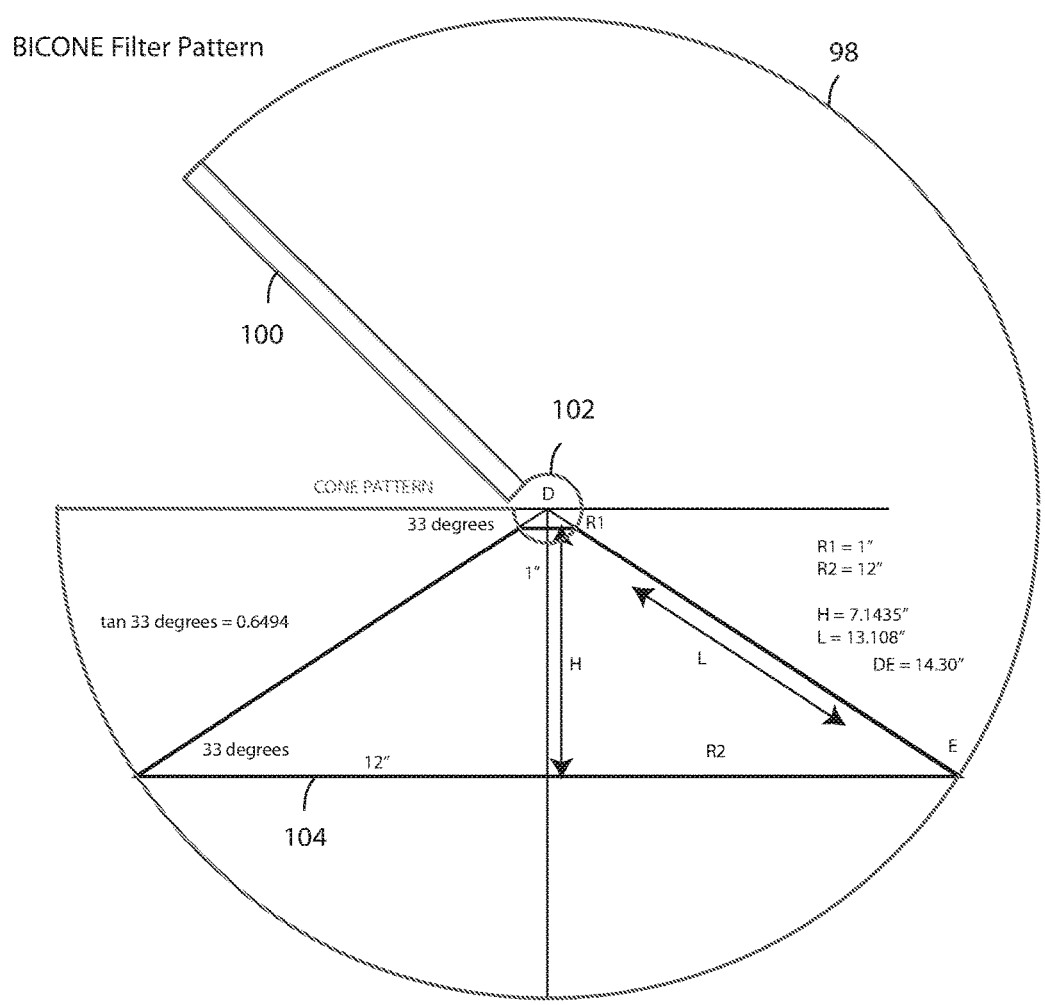
FIG. 2 shows an embodiment of a pattern for cutting a filter cone.

A pattern for cutting or stamping out a filter screen is shown in FIG. 2. The screen outer edge 98 corresponds to the outer edge of the larger dimension of the cone. The edges of a cutout with an optional overlap seam 100 are coupled to form the cone shape, including a hole for the central outlet 102. A cross section of the resulting cone shape is shown at 104.

Figure 3:
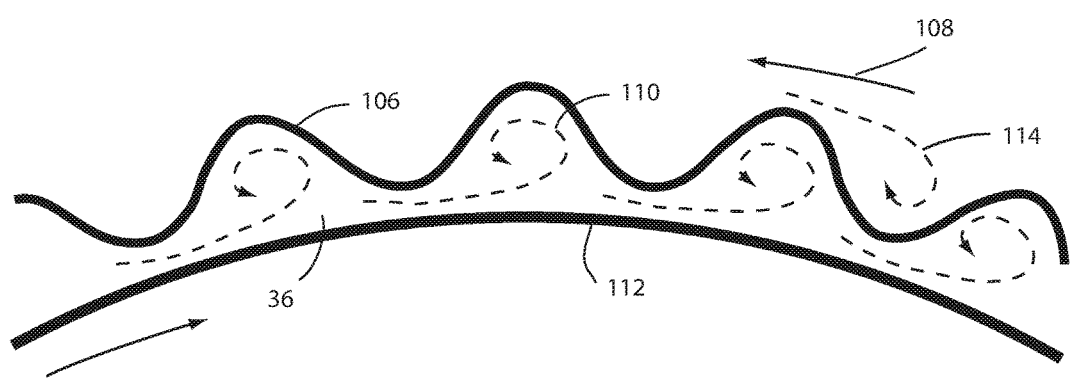
FIG. 3 shows detail of a filter edge showing scalloped design.

The flow patterns in the workspace are important for the operation of the filter cone. The form of the barrier disk can be a smooth cone, or it can have vanes or ridges, which can be stamped, 3D printed, cast or otherwise formed in a cost-effective way. As shown in a cross section of one example in FIG. 3, a barrier cone in a scalloped pattern 106 when in a direction of rotation 108 will advect the feed in the workspace 36 into a flow pattern 110 that intermittently forces the feed first toward and away from the filter cone surface 112. On the back side of the barrier cone, the feed in the feed zone will also be advected in a pattern 114. The ridges or vanes in the barrier cone may be radial to the axis, or slanted to form advecting vanes.

The direction of advection caused by the ridges or vanes on the inside of the barrier cone and the outside may be the same, or may need to be different. For example, the vanes on the outside of the barrier cone may advect the feed toward the axis, as is shown at 10 in FIG. 1, while the vanes facing the workspace 38 may need to advect away from the axis to sweep out the rejected solids. That means that the inside and outside surfaces of the barrier cone must have oppositely slanted vanes.

The filter and barrier cones may be co-rotating, or counter-rotating, as shown in FIG. 1. The cone pairs may also be stacked, as long as each cone pair has its own workspace, and the filter disk has its own filtrate liquid reservoir. For example, another cone pair can be located in the filtrate liquid reservoir 68, with a smaller diameter to fit within the filtrate liquid reservoir 68, and a second filtrate liquid reservoir under the second filter cone for the re-filtered filtrate.

Figure 4:
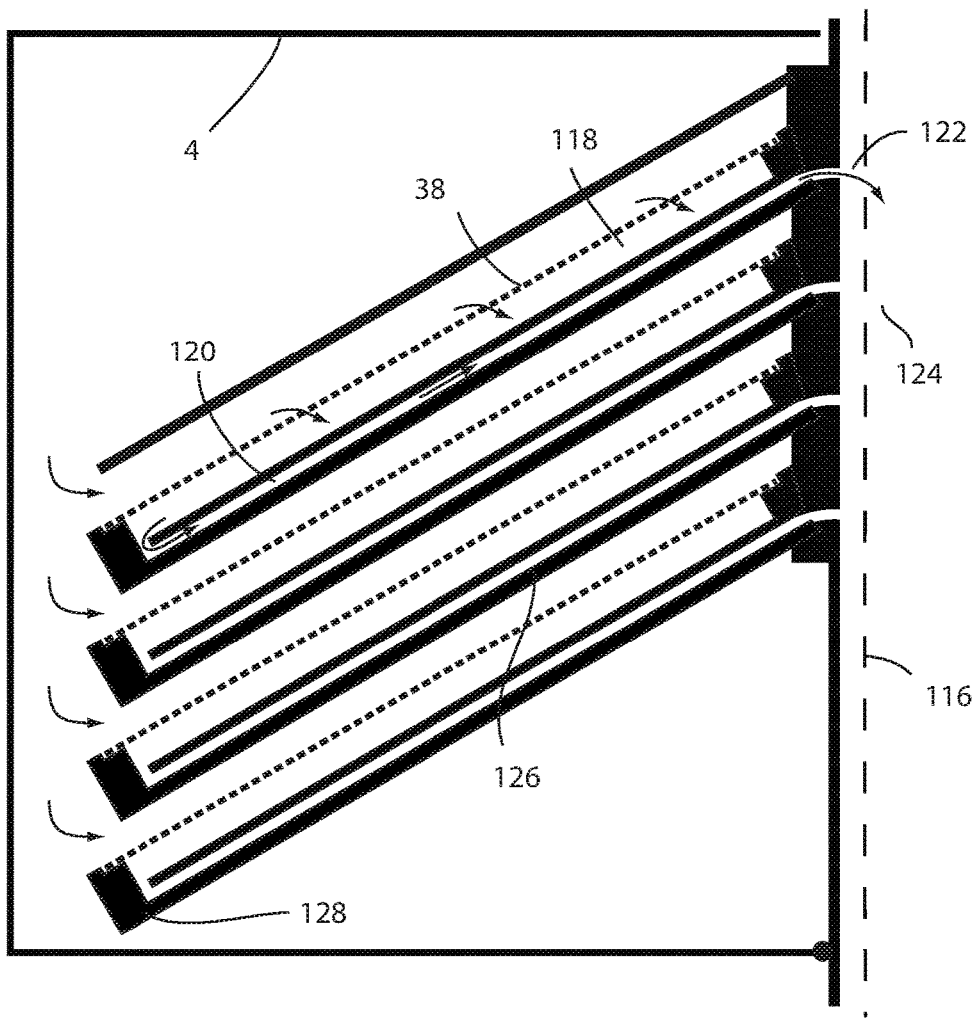
FIG. 4 shows a schematic half cross section of stacked filter sets.

An integrated stacked filter set design is shown in a schematic half cross section in FIG. 4. The axis of rotation is shown at 116 and a representation of the tank is at 4. In this design, there are multiple stacked filter sets, each set having a filtrate liquid reservoir 118 beneath the filter screen 38, and a return pipe 120. The motion of rotation of the filter set 130 serves to force the filtrate out of the filtrate reservoir 118 through the return tube in a flow 122 which brings the filtrate inward to a central axial drain 124. The underside surface of the filter cone 126 in this case is designed to act as a barrier cone for the filter set below.

Figure 5:
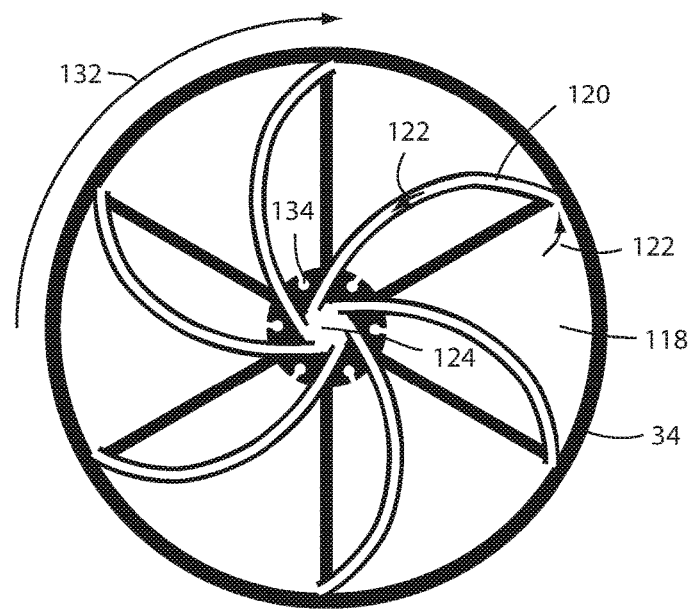
FIG. 5 shows a schematic cross section showing return channels.

An example of this stacked filter set 130 is seen from below with the barrier cone surface 126 removed in FIG. 5. The motion of rotation of the filter set 132 serves to force the filtrate out of the filtrate reservoir 118 through the return tube in a flow 122 which brings the filtrate inward to a central axial drain 124. Vent holes in the central support between the return pipes are shown at 134 which allow gases to escape vertically at the top of the workspaces of the stacked filter sets.

Figure 6:
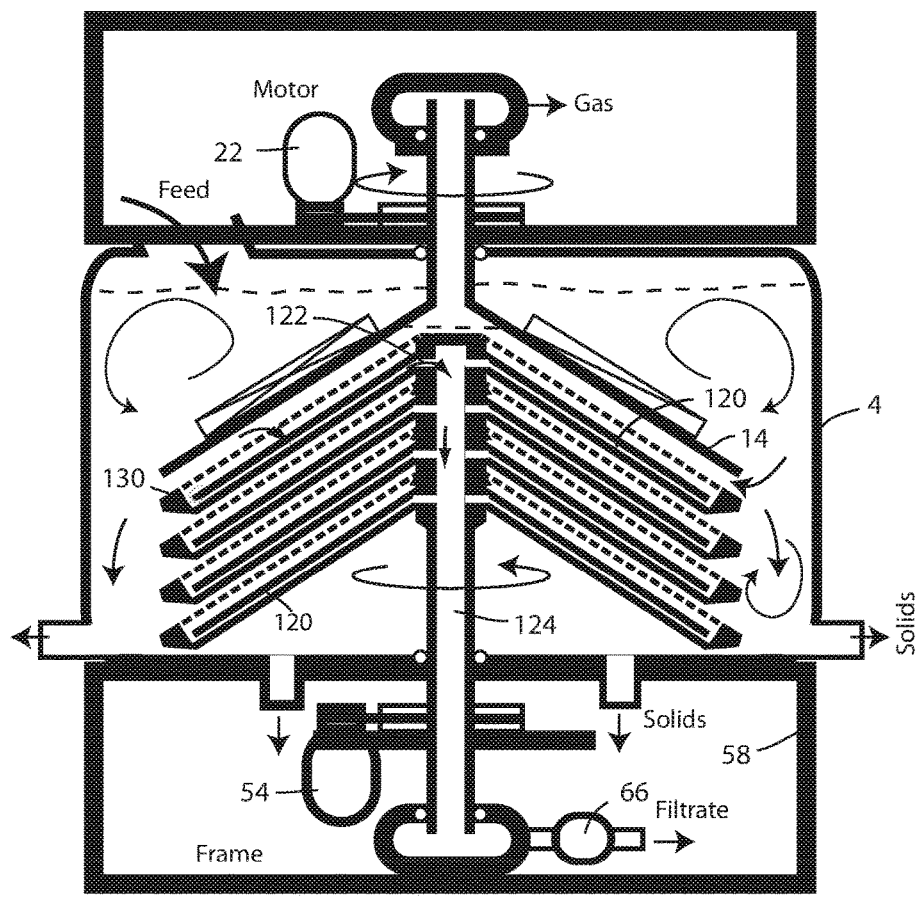
FIG. 6 shows a system with stacked filter sets.

A view of the apparatus with stacked filter sets is shown in FIG. 6. The stack is shown enclosed in a tank 4 with the barrier cone 14 at the top rotated by an upper rotation motor 22, and the stacked filter sets rotated by a bottom rotation motor 54. The relative rotations can be counter-rotation, co-rotations or rotations at different speeds. The return pipe 120 in each stacked filter set 130 returns the filtrate to a central drain 124, where a filtrate pump 66 aids in extraction, especially then the top of the drain pipe is closed, as is shown here, so suction through the return pipe can be created. To backflush the filter screens, the filtrate pump can be reversed to force the filtrate back through the filter screens, and this can be aided by a reversal of the direction of rotation of the filter sets also will help force the filtrate back through the return pipes in the opposite direction. The rejected solids, or the backwashed solids from the filter screens, will concentrate in the tank to be extracted through drains, which can include components such as filters, or devices such as screw conveyors.

If the tank and the central drain is divided vertically into one or more stages, then the filtrate from a first stage can re-enter the next stage of the tank from the center outward, then enter from the outside in through the one or more workspaces of the next stage. The filter screens, angles or rotation characteristics of each stage can be varied, to make a sequential processing sequence, such as to screen to successively finer levels of separation.

For backwashing a single filter cone as shown in FIG. 1, a relatively static backwash hose in close proximity to the filter screen can force liquid back through the rotating filter, with, for example, a linear radial motion of the hose from one end to the other being sufficient to cover the area of the rotating filter screen.

The tank should be of a suitable size and shape for long operation and low cost. It can be cylindrical, which could produce symmetrical inlet and outlet flow patterns in the I/O zone 88 relative to the edges of the disks. Or it can be rectangular or square, which could produce relative "dead zones" in the corners which aid in the settling of the solids in the solids zone 82. One example is the Den Hartog ST0120-32 120 gallon polyethylene tank, which roughly in the shape of a tall cube, and has fluted sides, which increase its strength and also can further disrupt the motion of the feed and encourage settling in the lower corners, where the drain outlets are located.

The frames to support the tank and the mechanical components on the top and bottom should be mated to the tank and designed for durability and easy maintenance.

This simple and scalable approach to filtration should have many applications. For example, filtration down to 0.5 microns (the width of the rod of a cholera virus) would protect water supplies, including the ballast water on ships. Dewatering sludge, including agriculture and industrial waste, allows the water to be recycled while the solids can into products by means such as the applicant's Shear Retort (U.S. Pat. No. 9,011,646) for pyrolysis.

While the present embodiments have been particularly shown and described above, it will be understood by one of ordinary skill in the art that various changes in form and details may be made therein without departing from the spirit and scope of the present embodiments as defined by the following claims.

What is claimed is:

1. An apparatus for filtration, comprising:
   a feed of sludge, containing liquid, solids, gases, and oil fed into a tank;
   the tank containing at least one spinning separation filter comprising a filter cone set comprising:
      a filter screen, and a barrier cone, arranged roughly in parallel, and defining a conical workspace between them;
      the conical workspace having a peripheral opening to the tank and a central opening communicating with the interiors of one or more hollow shafts supporting the barrier cone and the filter cone;
      the upper shaft supporting the barrier cone having an upper axial channel for the exit of gases, the lower shaft supporting the center of the filter cone having a lower axial channel for the exit of liquid or oil;
   motor means for producing rotation in said at least one spinning separation filter, and a filtrate liquid reservoir located underneath the filter cone for capturing the filtrate passing through the filter screen.

2. The apparatus of claim 1, wherein the outer edge of the filter cone is supported by a leak-proof connection to a static cylindrical wall which circumscribes the filtrate liquid reservoir.

3. The apparatus of claim 1, wherein vanes on the backside of the barrier cone advects the feed in the tank.

4. The apparatus of claim 1, wherein a relatively static backwash hose in close proximity to the filter screen forces liquid back through the rotating filter.

5. The apparatus of claim 4, wherein said backwash hose has a linear radial motion sufficient to cover the area of the rotating filter screen.

6. The apparatus of claim 1, wherein multiple separation filters are arranged in a stack.

7. The apparatus of claim 6, wherein the filtrate liquid reservoir is incorporated into each spinning filter cone set, with the filtrate exiting through a return pipe to the central axial shaft drain, and the underside of the filter cone set acts as the barrier cone defining the workspace for the next filter cone set farther down in the sequence.

8. The apparatus of claim 6, wherein said tank is divided vertically into one or more stages, and the filtrate from a first stage re-enters the next stage of the tank from the center outward, then enters from the outside in through the peripheral opening of one or more workspaces of the next stage.

9. The apparatus of claim 6, wherein the filter screens, angles or rotation characteristics of each stage are varied to make a sequential processing sequence.

10. The apparatus of claim 6, wherein the motor means is configured to reverse the direction of rotation of the separation filter to pump liquid or filtrate back from the central axial drain, through the return pipes and the liquid filtrate reservoir, and back through the filter screen to clean it and reject the solids outward.

11. The apparatus of claim 1, wherein concentrated solids exit through a solids drain in the tank.

12. The apparatus of claim 1, wherein gases exit through the upper axial channel.

13. The apparatus of claim 1, wherein oil riding on the top of the feed overflows into the lower axial channel for extraction.

14. A method for multiphase filtration, comprising:
   introducing a feed containing liquid, solids and gases into a tank with an I/O zone;
   communicating with a conical workspace in at least one spinning separation filter comprising a barrier cone and a filter cone with a filter screen; and
   collecting the filtrate passing through the filter screen while concentrating the rejected solids in a solids zone in the tank.

* * * * *